United States Patent
Narayanan et al.

(10) Patent No.: US 10,823,581 B2
(45) Date of Patent: *Nov. 3, 2020

(54) SENSOR POWER MANAGEMENT

(71) Applicant: Texas Instruments Incorporated, Dallas, TX (US)

(72) Inventors: Sriram Narayanan, Richardson, TX (US); David Louis Freeman, McKinney, TX (US); Marco Corsi, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 365 days.

This patent is subject to a terminal disclaimer.

(21) Appl. No.: 14/981,894

(22) Filed: Dec. 28, 2015

(65) Prior Publication Data

US 2016/0109261 A1  Apr. 21, 2016

Related U.S. Application Data

(63) Continuation of application No. 13/433,546, filed on Mar. 29, 2012, now Pat. No. 9,222,802.

(51) Int. Cl.
*G01D 3/10* (2006.01)
*G01D 18/00* (2006.01)

(52) U.S. Cl.
CPC ............... *G01D 3/10* (2013.01); *G01D 18/00* (2013.01)

(58) Field of Classification Search
CPC ................................ G01D 3/10; G01D 18/00
USPC .................................................. 702/183, 184
See application file for complete search history.

(56) References Cited

U.S. PATENT DOCUMENTS

| | | | |
|---|---|---|---|
| 6,415,205 B1 | 7/2002 | Myron et al. | |
| 7,904,185 B2 | 3/2011 | Sri-Jayantha et al. | |
| 9,222,802 B2 | 12/2015 | Narayanan et al. | |
| 2003/0114182 A1 | 6/2003 | Chan et al. | |
| 2005/0159116 A1 | 7/2005 | Xiong | |
| 2006/0017581 A1 | 1/2006 | Schwendinger et al. | |
| 2008/0118001 A1 | 5/2008 | Chan et al. | |
| 2009/0082691 A1 | 3/2009 | Denison et al. | |

(Continued)

FOREIGN PATENT DOCUMENTS

EP    1681771 B1    12/2008

OTHER PUBLICATIONS

Prosecution History from U.S. Appl. No. 13/433,546 dated Mar. 29, 2012 through Dec. 10, 2015 (233 pages).

*Primary Examiner* — Yoshihisa Ishizuka
(74) *Attorney, Agent, or Firm* — Michael A. Davis, Jr.; Charles A. Brill; Frank D. Cimino

(57) ABSTRACT

A sensor power management arrangement includes a signal processing circuit configured to receive signal from a sensor, to test the signal against at least one criterion, and to pass the signal for further processing in response to the signal passing the at least one criterion. In this way, only signals that are of a sufficient importance or significance will consume the maximum amount of processing energy and through processing by later processes or circuitry. Should a signal from a sensor not be strong enough or meet other criteria, power will not be wasted in preparing that signal for provision to the microcontroller or microprocessor. Additional flexibility in the sensor power management can be realized by adjusting the criteria against which the sensor signal is compared based on a status of the sensor apparatus.

3 Claims, 2 Drawing Sheets

(56) References Cited

U.S. PATENT DOCUMENTS

2009/0097581 A1     4/2009   McCallister et al.
2010/0145622 A1     6/2010   Haque et al.

SENSOR POWER MANAGEMENT

This application is a continuation of U.S. patent application Ser. No. 13/433,546 filed Mar. 29, 2012, the entire content of which is incorporated by reference herein.

TECHNICAL FIELD

This invention relates generally to sensor technology, and more specifically to controlling the power consumption of sensors.

BACKGROUND

Power consumption of electronic devices is becoming an increasingly important aspect of electronic design. Reducing power consumption of various electrical devices can result in cost savings, extension of battery life for portable devices, and address ecological and conservation concerns.

In the context of sensor based systems, various power management techniques are known as applied to microcontrollers, digital signal processors, and wireless communication systems as may be employed as part of a larger sensor system. These known power management techniques, however, are not applied to the sensor node itself. Sensors, for example, are required to be either "on" or "off" such that the sensor is able to detect the physical phenomenon for which the sensor is designed. For instance, a sensor configured to detect the presence of a person needs to be on to perform that function. Further power savings may be realized should power management techniques be able to be applied to the sensor as part of the larger power management scheme for a sensor network.

SUMMARY

Generally speaking and pursuant to these various embodiments, an apparatus includes a sensor configured to output a signal in response to detecting a phenomenon or outside stimulus. The apparatus also includes a signal processing circuit configured to receive the signal from the sensor and to test the signal against at least one criterion and to pass the signal for further processing in response to the signal passing the at least one criterion. Much of the electrical power consumed in connection with operation of a sensor is consumed as part of the operation of various circuit elements in developing or processing the sensor's signal before provision of that signal to a microcontroller or other processing device of the larger sensing apparatus. Thus, power savings can be realized by testing the sensor signal or information related to the sensor signal at various points in its initial processing prior to provision to a microcontroller or processing device for the larger sensing apparatus. In this way, only signals that are of a sufficient importance or significance will consume the maximum amount of processing energy and ultimately be processed by the microcontroller or microprocessor. Should a signal from a sensor not be strong enough or meet other criteria, power will not be wasted in preparing that signal for provision to the microcontroller or microprocessor.

Additional flexibility in the power management of the sensor can be realized by adjusting the criteria against which the sensor signal or information related to the sensor signal may be compared based on a status of the sensor apparatus. For example, if the sensor apparatus is connected to a continuous power supply such as wall socket, the criteria for blocking signals from further processing may be lower such that more signals are fully processed. If, on the other hand, the apparatus is operating off of battery that is drained to a certain level whereby power savings is more important, the criteria against which the sensor signal or information related to the sensor signal can be adjusted such that fewer signals are fully processed, thereby saving additional power. These and other benefits may become clearer upon making a thorough review and study of the following detailed description.

BRIEF DESCRIPTION OF THE DRAWINGS

The above needs are at least partially met through provision of the sensor power management described in the following detailed description particularly when studied in conjunction with the drawings where.

Skilled artisans will appreciate that the elements in the figures are illustrated for simplicity and clarity and have not necessarily been drawn to scale. For example, the dimensions and/or relative positioning of some of the elements in the figures may be exaggerated relative to other elements to help improve understanding of various embodiments of the invention. Also, common but well understood elements that are useful or necessary in a commercially feasible embodiment are often not depicted to facilitate a less obstructive view of these various embodiments. It will be further appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except for different specific meaning that has been set forth herein.

DETAILED DESCRIPTION

Figure 1:
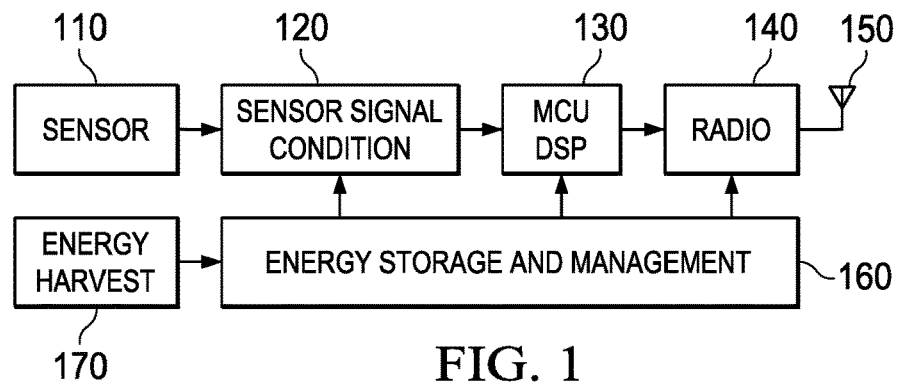
FIG. 1 comprises a block diagram of an example sensing apparatus as configured in accordance with various embodiments of the invention.

Referring now to the drawings, and in particular to FIG. 1, an illustrative context for operation of a power management apparatus or method compatible with many of these teachings will now be presented. FIG. 1 illustrates a sensor network including a sensor 110 that is configured to create a signal in response to sensing a physical phenomenon. Such sensors may include motion detectors, light detectors, sound detectors, vibration sensors, and the like. In response to sensing the physical phenomenon for which the sensor is designed to detect, the sensor 110 provides a signal to a sensor signal conditioning circuit 120. The sensor signal conditioning circuit 120 takes the initial sensor signal and processes it into a form receivable and understandable by a microcontroller unit or digital signal processing circuit 130. The processing circuit 130 processes the signal according to its programming or design such that the signal will trigger certain actions based upon the design and operation of the overall apparatus. For instance, in a wireless setting the processing circuit 130 can control a radio 140 to transmit signals regarding the operation of the sensor 110 via an antenna 150. In this example, an energy storage and management circuit 160 is configured to operate and control power management schemes for each of the sensor signal conditioning circuit 120, the microcontroller unit or digital signal processing circuit 130, and the radio 140. The power management of the microcontroller unit or digital signal processing circuit 130 and of the radio 140 are handled via conventional and known means that require no further description herein. The control of the power management for the sensor signal conditioner circuit 120 by the energy storage management circuit 160 will be described in further detail below.

The energy storage and management circuit 160 is further configured to receive information from an energy harvest circuit 170. The energy harvest circuit 170 is configured to collect information regarding the power status for the overall apparatus and provide that information to the energy storage and management circuit 160, so that the energy storage and management circuit 160 can take the appropriate action with respect to the power management of the various other circuits of the device.

Figure 2:
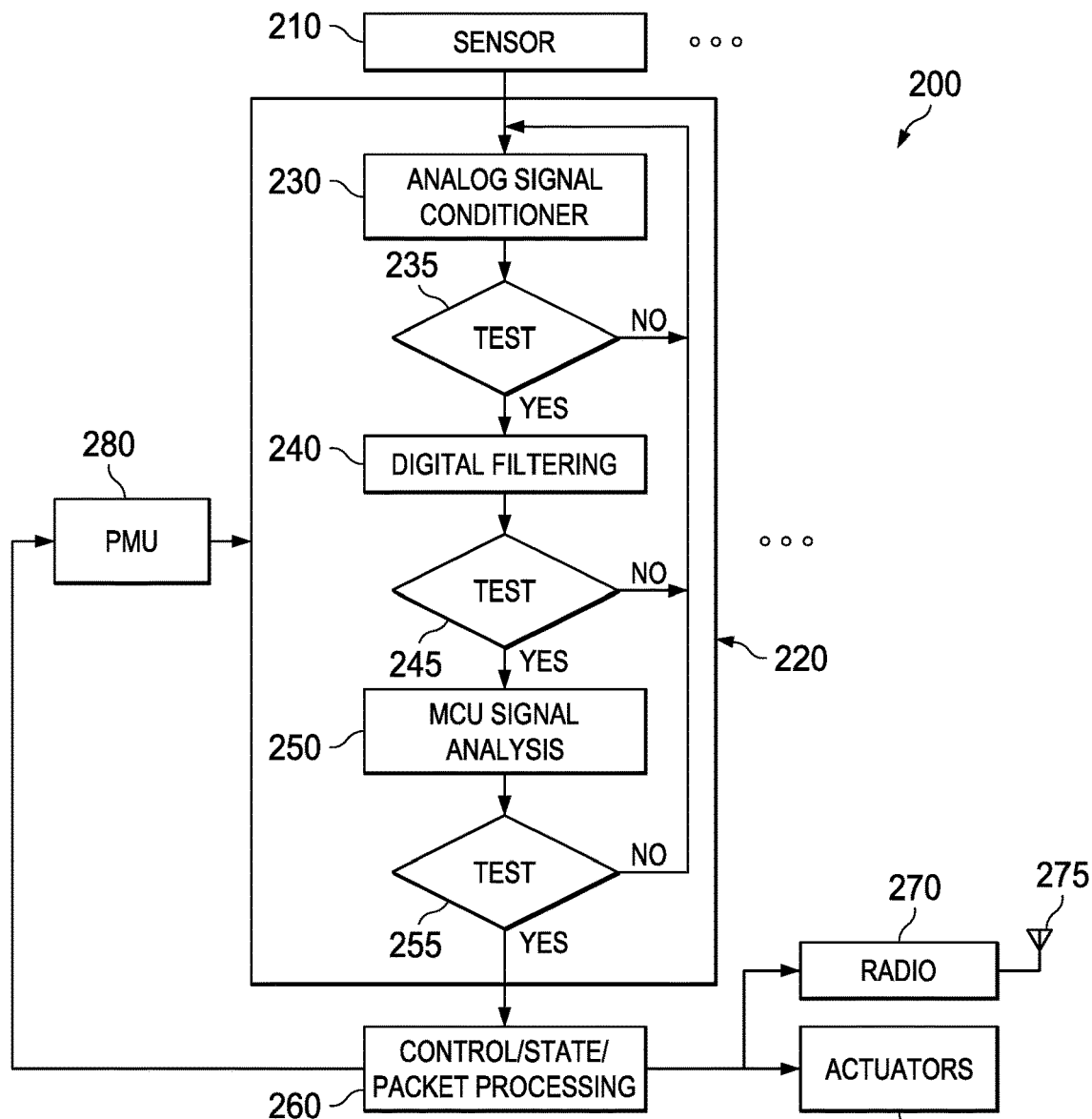
FIG. 2 comprises a block diagram of an example sensing apparatus as configured in accordance with various embodiments of the invention.

Turning to FIG. 2, an example apparatus 200 for implementing power management of sensor signals as illustrated. In this example, a sensor 210 is configured to output an analog signal in response to detecting a physical phenomenon. As discussed above, the signal is generated in response to any of a variety of physical phenomenon depending on the design and purpose of the given sensor. Such sensors and how the sensors create analog signals in response to physical phenomenon are well known in the art and need no further description herein. The apparatus 200 further includes a signal processing circuit 220 configured to receive the analog signal and to test the analog signal against at least one criterion. The signal processing circuit 220 is further configured to pass for further processing information related to the analog signal in response to the analog signal passing the at least one criterion. For example, depending on how the individual circuit is set up, the analog signal itself may be passed along to other circuitry for further processing in response to passing the at least one criterion, or in another approach a single circuit may just continue processing the analog signal as controlled by stored software or programming in response to the analog signal passing the at least one criterion. In yet another approach, instead of passing along the analog signal itself for further processing, a processed version of the analog signal or, more generally speaking, information regarding the analog signal may be passed for further processing in response to passing the test criterion. As indicated in FIG. 2, one or more sensors 210 may be connected to a single signal processing circuit 220. In a sensor node network, more than one sensor 210/signal processing circuit 220 is provided.

The signal processing circuit 220 can be configured to apply any of a number of tests to the analog signal or information relating to the signal before passing the signal or information regarding the signal for further processing. In one approach, the signal processing circuit 220 includes an analog signal conditioning circuit 230 configured to receive the analog signal and condition the analog signal to create a conditioned analog signal. The conditioning in this example may include any type of conditioning necessary to prepare the analog signal for further processing by the circuitry. In this example, the signal processing circuit 220 includes a test circuit 235 configured to test the conditioned analog signal against a signal criterion and to pass the conditioned analog signal for further processing. In response to the conditioned analog signal passing the signal criterion, one example test as may be applied by the test circuit 235 includes determining whether the conditioned analog signal is sufficiently strong compared to the background noise for the system to warrant further processing by the device although other tests are possible. Other example tests include determining whether the conditioned analog signal matches one or more particular time domain signatures, determining the frequency at which the conditioned analog signal crosses a zero line or other value, and detecting and counting peaks and valleys in an analog signal window to name but a few.

In another approach, the signal processing circuit 220 includes a digital filtering circuit 240 configured to receive a signal corresponding to the analog signal and to digitally filter the signal to create a digitally filtered signal. Digital filtering and conversion of analog signals into digital signals is well known in the art and needs no further description herein. In this approach, the signal processing circuit 220 includes a test circuit 245 configured to test the digitally filtered signal against a digital signal criterion and to pass the digitally filtered signal for further processing in response to the digitally filtered signal passing the digital signal criterion. One example of a test performed by the test circuit 245 relating to the digitally filtered signal is to confirm that the signal has a particular frequency or other characteristic sufficient to warrant further processing by the device although other tests are possible. Another example test includes sample-rate up-conversion or down-conversion to fit the requirements of later microcontroller or circuit processing.

In yet another approach, the signal processing circuit 220 includes a microcontroller signal analysis circuit 250 configured to receive a signal corresponding to the analog signal and to analyze the signal to create an analyzed signal. In this approach, the analysis performed to create the analyzed signal may comprise a more substitive analysis of the signal with respect to the type of signal being sensed by the sensor 210 although other analysis is possible. In this approach, a test circuit 255 is configured to test the analyzed signal against an analyzed signal criterion and to pass the analyzed signal for further processing in response to the analyzed signal passing the analyzed signal criterion. For example, the test circuit 255 in this approach may apply certain substitive tests to the analyzed signal to make the determination of whether the signal or information related to the signal may be processing further by the sensing device although other tests are possible. Another example test includes determining whether the signal or information regarding a signal from the particular sensor 210 should be transmitted in its entirety, in part, compressed, or not at all based on information received from other sensors in communication with the apparatus 200.

In this example illustrated in FIG. 2, the signal processing circuit 220 passes the information related to the analog signal to a processing device 260 configured to receive the information and act according to its programming or configuration in response to the information. In various embodiments, the processing device 260 may be a controller, a state processing device, or a packet processing device depending on the configuration of the overall apparatus 200. The processing device 260, in this example, is in communication with a radio 270 to send and receive signals via an antenna 275. The processing device 260 is also in communication with actuators 277 to control physical devices based upon the overall design of the apparatus 200. Such applications of sensing devices or networks are known in the art and need no further description herein.

By one approach, the apparatus 200 can be configured such that the criterion against which the analog signal or information related to the analog signal is compared or tested can be variable to provide additional flexibility for the design and application of the apparatus 200. In one example for providing this flexibility, a power management unit circuit 280 is in communication with the signal processing circuit 200. In this example, the power management unit circuit 280 is configured to adjust the at least one criterion in response to a change in electrical power supply condition for the apparatus 200. For instance, the power management unit circuit 280 can be configured to receive information relating to the electrical power supply condition for the apparatus such as from the processing device 260. The information relating to the electrical power supply condition can include, for example, one or more of the type of power source being used by the apparatus 200, the power available from the power source 200, a maximum power draw available from the power source 200, an approximate time left before the power source becomes unavailable for the apparatus 200, or the like.

In another example, the power management unit circuit 280 is configured to adjust the at least one criterion in response to a feedback signal indicating a priority of signals to be passed for further processing. The power management unit circuit 280 in the illustrated example receives the feedback signal indicating the priority of signals to be passed for further processing from the processing device 260. In this case, the feedback signal is used by the power management unit circuit 280 to directly control the criterion based on feedback signal. For instance, the feedback signal can provide a specific direction with respect to each criterion as based on a given programming or operational environment as may be programmed into the processing device 260. By one example, the processing device 260 may note that a particular signal from the sensor 210 indicates a situation of interest such that it is worth operating the sensor 210 in a high power usage mode to obtain an increased amount of signals from the sensor 210 in view of the signal of interest. In that situation, the processing device 260 will send a feedback signal to the power management unit circuit 280 to adjust the test criteria to allow more signals from the sensor 210 to be fully processed. For example, a motion sensor may operate at a low power (i.e., fewer signals being processed) mode until a large indication of motion is sensed, at which time the motion sensor may be changed to a high power (i.e., more signals being processed) mode to obtain finer details regarding the sensed movement. In another example, the processing device 260 can receive signals with information regarding the activity of other sensors, and if another sensor node registered significant activity, in response the processing device 260 can send a feedback signal to the power management unit circuit 280 to cause the power management unit circuit 280 to allow more or all signals from the sensor 210 to be fully processed in view of the other sensor activity. In still another example, the processor circuit 260 is configured to monitor the signals or information regarding the signals from the sensor 210 and determine that a particular signal or signal pattern is merely background noise. In this case, the particular signal or signal pattern can be dismissed to limit energy waste processing background signals.

The power management unit circuit 280 can be configured to execute either or both of the above processes (control based on information regarding the power supply and/or control based on a feedback signal) depending on the application. For example, in a multi-modal setting (including multiple sensors), the power management unit circuit 280 can be configured to fully power down one or more of the sensors, or fully activate some or all of the sensors, according to the information regarding the power supply and or the feedback signal depending on the power and sensor sensitivity needs at a given time. In a sensor node network with more than one sensor or signal processing circuit, one power management unit circuit 280 can communicate with multiple sensors and signal processing circuits or each signal processing circuit can have a dedicated power management unit circuit 280.

Those skilled in the art will recognize and appreciate that such a processor devices such as the signal processing circuit 220 (including the circuits described therein), the processing circuit 260, and the power management unit circuit 280 can comprise fixed-purpose hard-wired platforms or can comprise partially or wholly programmable platforms. All of these architectural options are well known and understood in the art and require no further description here. Those skilled in the art will further recognize and understand that such circuits may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art. In another design option, the test circuits 235, 245, and 255 may include one of the group consisting of low-complexity energy detectors, max/min comparators, low-complexity filter banks, and combinations thereof.

In an additional alternative embodiment, the functionality or logic described in FIG. 2 may be embodied in the form of code that may be executed in a distinct processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Figure 3:
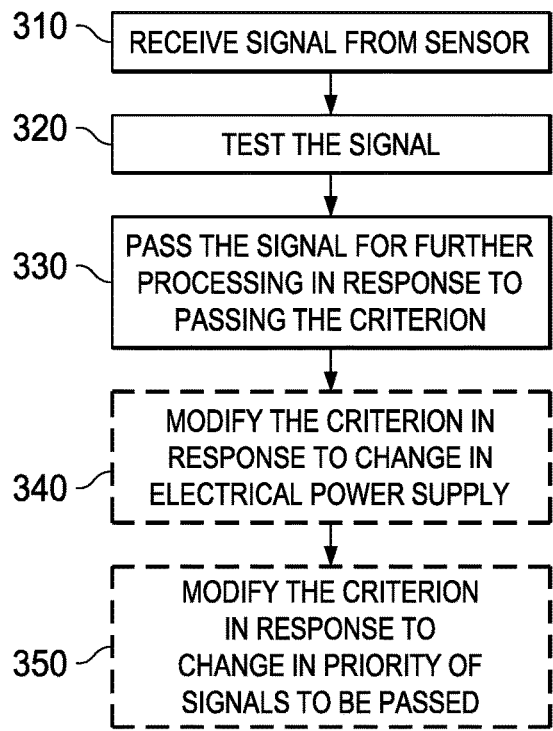
FIG. 3 comprises a flow diagram of an example power management method as configured in accordance with various embodiments of the invention.

Turning now to FIG. 3, an illustrative process that is compatible with many of these teachings will now be presented. The method includes receiving 310 an analog signal from a sensor configured to output the analog signal in response to detecting a physical phenomenon. The method further includes testing 320 by a signal processing circuit the analog signal against at least one criterion. Information related to the analog signal is passed 330 for further processing by other circuitry in response to the analog signal passing the at least one criterion. Optionally, the method may include modifying 340 the at least one criterion in response to a change in an electrical power supply condition for the other circuitry and/or modifying 350 the at least one criterion in response to receiving a feedback signal indicating a priority of signals to be passed for further processing as described herein.

Figure 4:
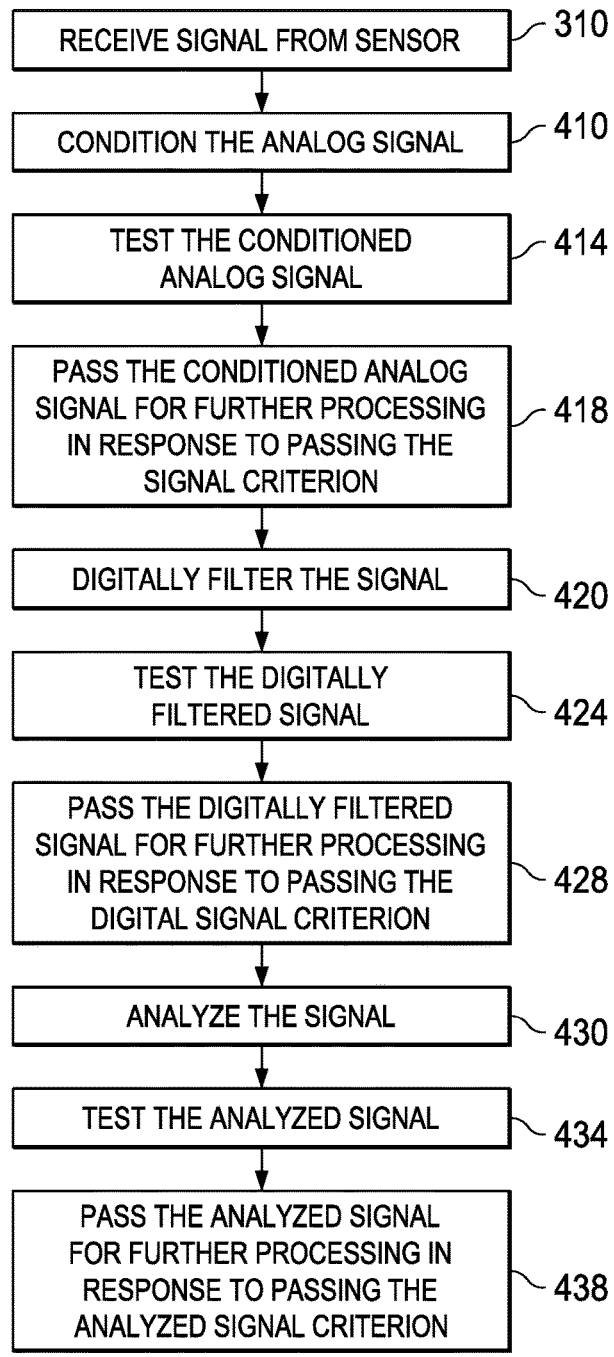
FIG. 4 comprises a flow diagram of another example power management method as configured in accordance with various embodiments of the invention.

The steps of testing 320 the signal and passing 330 the signal for further processing in response to passing the criterion during the testing 320 can be performed in any number of ways. With reference to FIG. 4, one example process for testing and passing a signal or information regarding a signal from a sensor will be described. One of skill in the art will recognize that although the flow chart of FIG. 4 shows a specific order of implementation, it is understood that the order may differ from that which is depicted depending on various factors, such as, for example, the time it takes for various circuits to complete various tasks and the like. For example, the order of two or more blocks may be scrambled relative to the order shown. Also, two or more blocks shown in succession may be executed concurrently or with partial concurrence. Moreover, certain blocks may be omitted altogether depending on the given configuration. It is understood that all such variations are within the scope of these teachings.

In the illustrated example, the method includes conditioning 410 the analog signal to create a conditioned analog signal and testing 414 the conditioned analog signal against a signal criterion. The method in this approach includes passing 418 the conditioned analog signal for further processing in response to the conditioned analog signal passing the signal criterion. In another aspect, the method includes digitally filtering 420 a signal corresponding to the analog signal to create a digitally filtered signal and testing 424 the digitally filtered signal against a digital signal criterion. In this case, the digitally filtered signal is passed 428 for further processing in response to the digitally filtered signal passing the digital signal criterion. In still another aspect, the method includes analyzing 430 a signal corresponding to the analog signal to create an analyzed signal and testing 434 the analyzed signal against an analyzed signal criterion. Here, the analyzed signal is passed 438 for further processing in response to the analyzed signal passing the analyzed signal criterion. Each of these various analyses can be done in view of various criteria such as those described above with reference to FIG. 2.

In one example, if each of the signal processing, testing, and passing steps as described with reference to FIG. 4 were configured to work together in a single apparatus, the apparatus may be described as follows. The apparatus in such an example would include, with reference to FIG. 2, a sensor 210 configured to output an analog signal in response to detecting a physical phenomenon and an analog signal conditioning circuit 230 configured to receive the analog signal and to condition the analog signal to create a conditioned analog signal. The apparatus further includes an analog test circuit 235 configured to test the conditioned analog signal against a signal criterion and to pass the condition analog signal for further processing in response to the conditioned analog signal passing the signal criterion. The next portion of processing in this apparatus includes a digital filtering circuit 240 configured to receive the conditioned analog signal in response to the conditioned analog signal passing the signal criterion. In this case, the digital filtering circuit 240 is configured to digitally filter the conditioned analog signal to create a digitally filtered signal. A digital test circuit 245 is configured to test the digitally filtered signal against a digital signal criterion and to pass the digitally filtered signal for further processing in response to the digitally filtered signal passing the digital signal criterion. In a further portion of the analysis, a microcontroller signal analysis circuit 250 is configured to receive the digitally filtered signal and to analyze the digitally filtered signal to create an analyzed signal. Here, an analyzed signal test circuit 255 is configured to test the analyzed signal against an analyzed signal criterion, and to pass the analyzed signal for further processing in response to the analyzed signal passing the analyzed signal criterion. The analog test circuit 235, the digital test circuit 245, and the analyzed signal test circuit 255 in various approaches may comprise one or more of the group consisting of low-complexity energy detectors, max/min comparators, low-complexity filter banks, and combinations thereof. Using such circuitry and approaches, the test circuits can be configured to analyze and pass the signals in any of a variety of ways that may be suitable to a given application.

A power management unit circuit 280 is in communication with the analog test circuit 235, the digital test circuit 245, and the analyzed signal test circuit 255. In this configuration, the power management unit circuit 280 is configured to adjust the signal criterion, digital signal criterion, and analyzed signal criterion in response to a change in an electrical power supply condition for the apparatus. In one optional approach, the power management unit circuit 280 is configured to receive a power supply signal indicating the electrical power supply condition for the apparatus. In response to receiving a power supply signal indicating a large electrical power supply for the apparatus, the power management unit circuit 280 is configured to adjust the signal criterion, the digital signal criterion, and the analyzed signal criterion to allow more signals to pass for further processing. In another approach, the power management unit circuit 280 is configured to, in response to receiving a power supply signal indicating a restricted electrical power supply to the apparatus, adjust the signal criterion, the digital signal criterion, and the analyzed signal criterion to allow further signals to pass for further processing, thereby conserving electrical power.

In a further aspect, the power management unit circuit 280 is configured to receive a feedback signal indicating a priority of signals and in response to receiving the feedback signal to adjust the signal criterion, the digital signal criterion, and the analyzed signal criterion to allow certain signals to pass for further processing in accord with the feedback signal. In this aspect, the power management unit circuit 280 can react to feedback signals from elsewhere in the device with respect to how sensitive the sensor needs to be or the number of sensors that need to be fully activated as described above.

So configured, systems including sensor devices can have improved power management controls through control of the processing of signals generated by various sensors. For instance, because sensors at their base level usually initiate in the first instance an analog signal, if that initial analog signal does not pass a certain criterion, then further power is not wasted by processing that signal. To further process that analog signal, for example, by turning the analog signal into a digital signal for digital processing to thereby save energy. Additional processing steps for signals generated by sensors can then be successive avoided depending on the type of sensor and phenomenon being detected and tracked by a given system. Using the power management techniques described in this disclosure, not only can power savings be realized with respect to a single sensor, multi-sensor systems can also be manipulated to realize power savings using the same techniques.

Those skilled in the art will recognize that a wide variety of modifications, alterations, and combinations can be made with respect to the above described embodiments without departing from the scope of the invention. For instance, the sensor and sensor signal conditioning circuit may be combined into a single housing with other circuitry located elsewhere. Such modifications, alterations, and combinations are to be viewed as being within the ambit of the inventive concept.

What is claimed is:

1. An apparatus comprising:
a sensor configured to output an analog signal responsive to detecting a physical phenomenon;
an analog signal conditioning circuit coupled to the sensor, the analog signal conditioning circuit configured to receive the analog signal and to condition the analog signal to form a conditioned analog signal;
a digital filtering circuit coupled to the analog signal conditioning circuit, the digital filtering circuit configured to receive the conditioned analog signal responsive to the conditioned analog signal passing a signal criterion and to digitally filter the conditioned analog signal to form a digitally filtered signal;
a microcontroller signal analysis circuit coupled to the digital filtering circuit, the microcontroller signal analysis circuit configured to receive the digitally filtered signal and to analyze the digitally filtered signal to form an analyzed signal; and
a power management unit circuit coupled to the digital filtering circuit, the power management unit circuit configured to adjust the signal criterion to increase a number of instances of the conditioned analog signal that pass the signal criterion, responsive to the analyzed signal indicating a signal condition of interest from the sensor.

2. The apparatus of claim 1, wherein the power management unit circuit is configured to:
receive a power supply signal indicating an unrestricted electrical power supply condition or a restricted electrical power supply condition;
responsive to the power supply signal indicating the unrestricted electrical power supply condition, adjust the signal criterion to increase the number of instances of the conditioned analog signal that pass the signal criterion; and
responsive to the power supply signal indicating the restricted electrical power supply condition, adjust the signal criterion to reduce the number of instances of the conditioned analog signal that pass the signal criterion.

3. The apparatus of claim 1, wherein the power management unit circuit is configured to:
receive a feedback signal indicating a priority of signals; and
responsive to the feedback signal, adjust the signal criterion to allow only a subset of instances of the conditioned analog signal to pass the signal criterion.

* * * * *